US009624997B2

(12) United States Patent
Marelli

(10) Patent No.: US 9,624,997 B2
(45) Date of Patent: *Apr. 18, 2017

(54) POOL SPRING COVER

(71) Applicant: MX4 Engineering LLC, Florham Park, NJ (US)

(72) Inventor: Dean Marelli, Florham Park, NJ (US)

(73) Assignee: MX4 Engineering LLC, Florham Park, NJ (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/680,220

(22) Filed: Apr. 7, 2015

(65) Prior Publication Data
US 2015/0211591 A1    Jul. 30, 2015

Related U.S. Application Data

(63) Continuation of application No. 13/102,571, filed on May 6, 2011, now Pat. No. 9,027,174.

(51) Int. Cl.
*E04H 4/00* (2006.01)
*F16F 1/12* (2006.01)
*E04H 4/10* (2006.01)
*F16F 1/06* (2006.01)

(52) U.S. Cl.
CPC ............. *F16F 1/128* (2013.01); *E04H 4/10* (2013.01); *F16F 1/06* (2013.01); *Y10T 29/49826* (2015.01)

(58) Field of Classification Search
CPC ............. F16F 1/06; F16F 1/128; E04H 4/10
USPC .............................................. 4/503
See application file for complete search history.

(56) References Cited

U.S. PATENT DOCUMENTS

| 1,594,962 | A | 8/1926 | Jacobs et al. |
| 2,958,872 | A | 11/1960 | Meyer, Jr. |
| 3,231,950 | A | 2/1966 | Lummis |
| 3,653,652 | A | 4/1972 | Lindberg, Jr. |
| 3,853,343 | A | 12/1974 | Hunter |
| 3,869,120 | A | 3/1975 | Nissen |
| 4,361,934 | A | 12/1982 | Darnell |
| 4,916,763 | A | 4/1990 | Christensen |
| 6,928,671 | B2 | 8/2005 | Pagano et al. |
| 7,735,163 | B2 | 6/2010 | Comitino et al. |

(Continued)

OTHER PUBLICATIONS

Merlin Industries, Inc., Safety Covers Catalog, 6 pages (2008).

*Primary Examiner* — Tuan N Nguyen
(74) *Attorney, Agent, or Firm* — Lerner, David, Littenberg, Krumholz & Mentlik, LLP

(57) ABSTRACT

Provided is a pool spring cover having an elongate tubular member with openings on first and second sides, respectively. The first and second sides span a longitudinal axis. An attachment member extends generally along the longitudinal axis from a first portion of the second side to a free end. A fastener comprised of a first fastener element and a second fastener element is provided. The first fastener element is associated with the attachment member at the free end and the second fastener element is associated with the tubular member at a second portion of the second side. The first and second fastener elements are adapted to fasten to each other such that the attachment member forms a loop. The first fastener element and the second fastener element may form a one-time use fastener. Also provided are related systems and methods.

20 Claims, 7 Drawing Sheets

(56) References Cited

U.S. PATENT DOCUMENTS 8,245,362 B2     8/2012   Blevins
9,027,174 B2 *   5/2015   Marelli .................. F16F 1/128
                                                             4/503

* cited by examiner

POOL SPRING COVER

CROSS-REFERENCE TO RELATED APPLICATIONS

The present application is a continuation of U.S. patent application Ser. No. 13/102,571, filed May 6, 2011, the entire disclosure of which is incorporated herein by reference.

BACKGROUND OF THE INVENTION

The present invention relates to pool covers and springs for attachment of the pool covers to pool decking. In particular, the present invention relates to apparatuses, systems, and methods for protecting pool decks from the pool cover springs.

In-ground pools are often covered for the "season" in areas of the country where weather prevents year round use, or for other reasons. Such covers are typically manufactured from mesh or other materials, and extend over the edge of the pool onto the pool decking. They are secured to anchors, usually in the form of a post, provided in the decking by the combination of straps and pool cover springs. Typically, the straps emanate from the pool cover itself and are attached to the posts by the pool cover springs. It will be appreciated that these springs expand and contract as water, snow, debris, wind, and the like exert ever-changing forces on the cover. This expansion and contraction has been known to mar the pool decking, which the springs generally rest on.

BRIEF SUMMARY OF THE INVENTION

It would therefore be advantageous to provide a device for protecting the decking from marring caused by this expansion and contraction. It would also be advantageous to provide a solution that remains affixed to the spring even when the pool cover is removed and stored. To achieve these results, the present invention provides, in one embodiment a pool spring cover comprising an elongate tubular member having a first opening on a first side and a second opening on a second side, the first side and second side spanning a longitudinal axis. An attachment member extends generally along the longitudinal axis from a first portion of the second side to a free end. A fastener comprised of a first fastener element and a second fastener element is provided. The first fastener element is associated with the attachment member at the free end and the second fastener element is associated with the tubular member at a second portion of the second side. The first and second fastener elements are adapted to fasten to each other such that the attachment member forms a loop.

The first fastener element and the second fastener element may form a one-time use fastener.

The association of the fastener element with the tubular element at the second portion of the second side may be at a portion of the tubular member generally opposed to the attachment member such that the loop extends across the second opening.

In another embodiment of the present invention, a pool cover spring system comprises a pool cover spring and a pool cover spring cover. The pool cover spring cover is formed from an elongate tubular member having an attachment member extending from a first end thereof, the attachment member having a first portion of a fastening device and the pool cover spring cover having a second portion of the fasting device at the first end thereof. At least a portion of the pool cover spring is provided inside the elongate tubular member and the first portion of the fastening device and the second portion of the fastening device are fastened together.

The second portion of the fastening device may be on an exterior surface of the pool cover spring cover.

The fastening device may a one-way fastener.

The spring may include a first connection element adapted to be connected to a strap of a pool cover, the attachment member being threaded through the first connection element. In such case, the first connection element may be substantially triangular. The spring may include a second connection element on an opposite end of the first connection element, the second connection element adapted to be connected to a pool deck fixture. The second connection element may be substantially circular.

The spring may comprise a first connection member and a second connection member, with a helical spring section therebetween, the at least a portion of the pool cover spring being at least a majority of the helical spring section.

The pool cover spring system may further comprise a second pool cover spring and a second pool cover spring cover. The second pool cover spring cover may be formed from an elongate tubular member having an attachment member extending from a first end thereof, the attachment member having a first portion of a fastening device and the pool cover spring cover having a second portion of the fastening device at a first end thereof. At least a portion of the second pool cover spring may be provided inside the elongate tubular member of the second pool cover spring cover and the first portion of the fastening device and the second portion of the fastening device of the second pool cover spring cover may be fastened together. The pool cover spring system may further comprise a pool cover, the pool cover spring and the second pool cover spring both being attached to the pool cover. The attachments may be by straps.

In a further embodiment of the present invention, a method of protecting pool decking from damage caused by pool cover springs is provided. The method comprises threading a pool cover spring device within the tubular body of a pool cover spring cover, the pool cover spring cover having an attachment member with a one-time use attachment device; threading the attachment member through a portion of the pool cover spring device; and connecting the attachment device of the attachment member to the tubular member to secure the pool cover spring cover to the pool cover spring device.

The connecting step may ensure that the tubular member does not travel along with the pool cover spring device as the spring expands and contracts.

The method may further comprise attaching the pool cover spring device to a pool cover at a first end of the pool cover spring device; and attaching the pool cover spring device to a fixture of a pool deck at a second end of the pool cover spring device.

The step of threading the attachment member through a portion of the pool cover spring device may thread the attachment member through a substantially triangular portion of the pool cover spring device, the pool cover spring device having a substantially circular portion opposite the substantially triangular portion, with a helical spring portion therebetween.

The connecting may be by one of chemical welding, heat welding, or adhesive.

The connecting may be with a one-time use connection device.

BRIEF DESCRIPTION OF THE DRAWINGS

The above description, as well as further features and advantages of the present invention will be more fully understood with reference to the following detailed description of the Pool Spring Cover, when taken in conjunction with the accompanying drawings, wherein.

DETAILED DESCRIPTION

In describing the preferred embodiments of the subject matter illustrated and to be described with respect to the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 1:
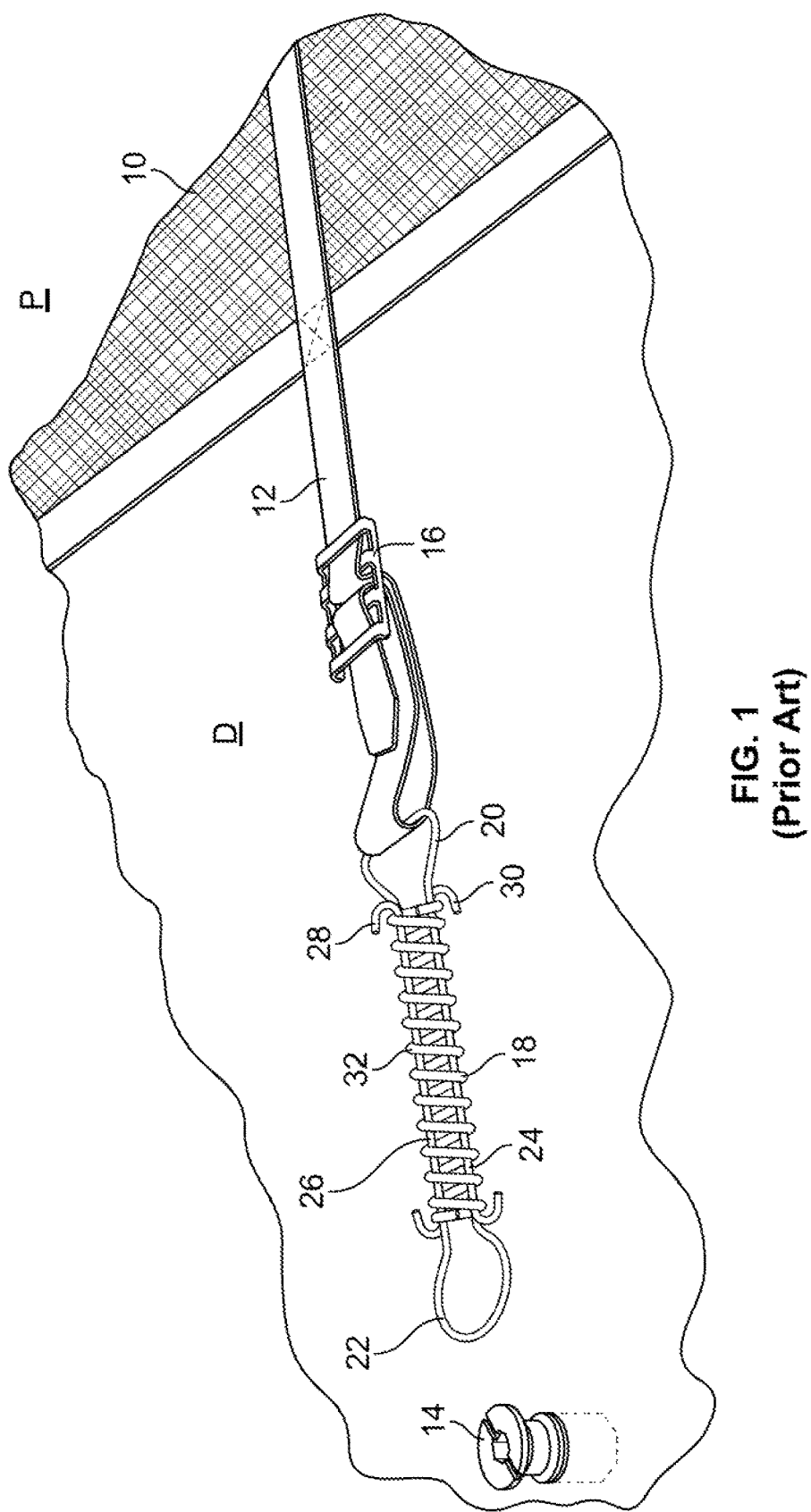
FIG. 1 depicts a perspective view of a conventional pool cover spring system in a partially installed condition.

Described herein are embodiments of the Pool Spring Cover and associated systems and methods of the present invention. Prior to addressing such embodiments, however, note is taken to FIG. 1, a perspective view of a conventional pool cover spring system in a partially installed condition. As shown, a pool P is provided with decking or a deck D. In order to protect the pool during the "off-season" or other times when it is desirous to cover the pool, a pool cover 10 may be provided over the pool P. Typically, the pool cover 10 will extend over the edge E of the pool P and onto the decking D. The pool cover P is provided with straps 12 spaced at intervals along the perimeter of the pool cover, although only one such strap is shown in FIG. 1. Likewise, the pool deck D is provided with anchors, such as posts 14, around the perimeter of the cover 10. The posts 14 are known in the pool installation arts and may be partially screwed into metal collars provided in the pool deck for use. When not in use, they may be completely screwed into the collars such that their upper surfaces are somewhat flush with the pool deck. In any event, it will be appreciated that there is typically one post 14 for each strap 12. The strap 12 is provided with a turnbuckle 16 to adjust its length, but is otherwise typically non-elastic. At the end of the strap 12 is a spring device 18, which effectively connects the strap to the post 14.

The spring device 18 is provided with a first connection element 20 which is typically substantially triangular and a second connection element 22 which is typically substantially circular. The connection elements 20, 22 each have extension members 24, 26 that extend between the two members in a parallel configuration, such that the first connection element 20 and second connection element 22 are on opposite ends of the spring device 18. The extension members 24, 26 each end in pairs of hooks 28, 30. Between the hooks 28, 30, and extending along the extension members 24, 26, is a helical spring 32. The helical spring 32 surrounds the extension members 24, 26 and is bound by the hooks 28, 30.

Although not shown in FIG. 1, when fully installed, the second connection element 22 is positioned over the post 14 such that the helical spring 32 is compressed by tensile forces acting on the spring device 18 from the strap 12 and cover 10. It will be appreciated, however, that the tensile forces are dynamic, and are lightened or increased at various times due to forces acting on the pool cover 10. A lightening of the force permits the helical spring 32 to expand, moving the first connection element 20 farther from the second connection element 22. An increase of force, on the other hand, causes the helical spring 32 to compress between the hooks 28, 30 as the first connection element 20 is spread further apart from the second connection element 22.

It will be appreciated that this expansion and contraction of the helical spring 32 often causes the spring device 18 to rub against the deck D, possibly marring or even damaging the deck. In order to protect the deck D, and even to shield the helical spring 32 from some environmental exposure, the spring device 18 may be provided with an inventive pool spring cover. An embodiment of one such cover is shown in FIG. 2.

Figure 2:
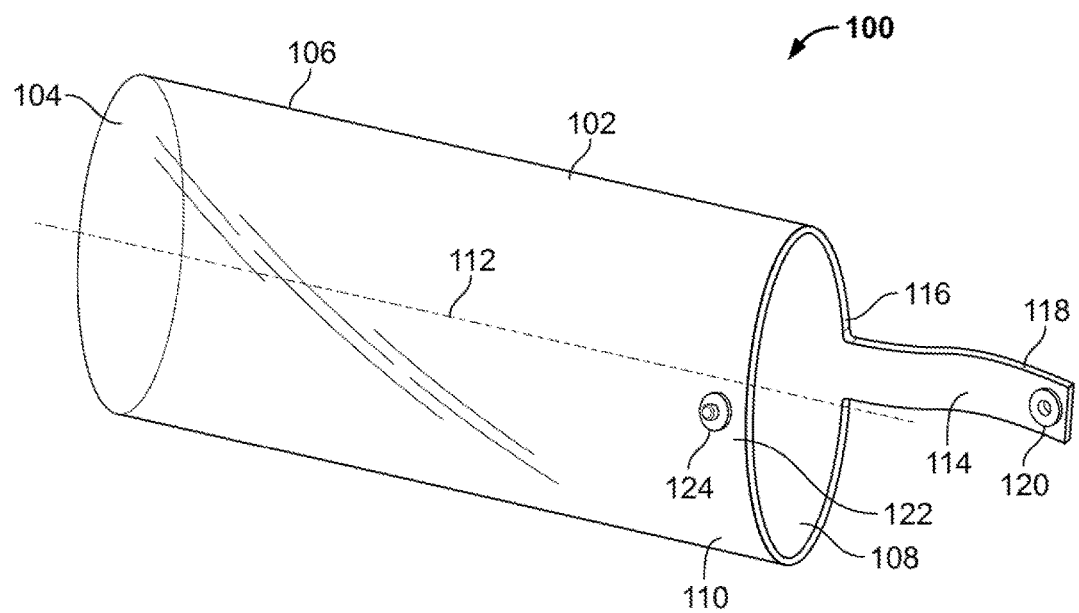
FIG. 2 depicts a perspective view of a pool spring cover in accordance with a first embodiment of the present invention.

As shown in FIG. 2, a first embodiment of the pool spring cover 100 is formed from an elongate tubular member 102 having a first opening 104 on a first side 106 and a second opening 108 on a second side 110. The first and second sides 106, 110 span a longitudinal axis 112 of the elongate tubular member 102. An attachment member 114, formed as an integral piece with the tubular member 102 in this embodiment, extends from a first portion 116 of the second side 110 to a free end 118. At the free end 118 is a first fastener element 120.

At a second portion 122 of the second side 110 of the tubular member 102 is a second fastener element 124. It will be appreciated that in this embodiment, the second portion 122 of the second side 110 is provided directly opposite to the first portion 116 of the second side such that the second fastener element 124 is approximately 180 degrees around the tubular member 102 from the attachment member 114 and the first fastener element 120. In other embodiments, the two fastener elements 120, 124 need not be 180 degrees apart.

Figure 3A:
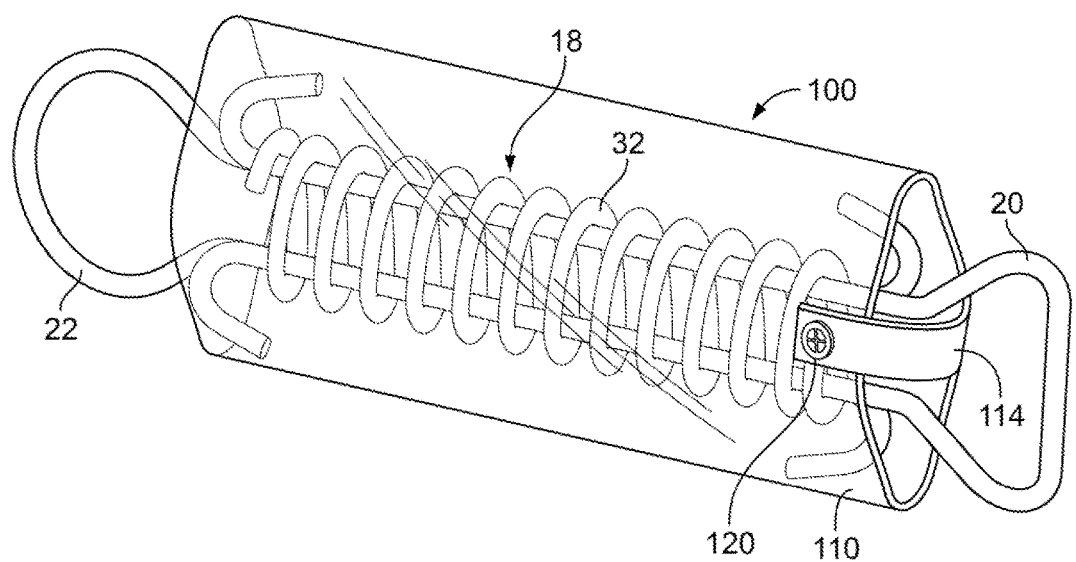
FIG. 3A depicts a perspective view of the pool spring cover of FIG. 2 with a pool spring.

As shown in FIG. 3A, the tubular member 102 of the pool spring cover 100 may be fitted over the helical spring 32 portion of the spring device 18 such that the second side 110 of the pool spring cover 100 is adjacent to the substantially triangular first connection element 20. The attachment member 114 may then be threaded through the substantially triangular first connection element 20 and the first fastener element 120 fastened to the second fastener element 124.

It is noted here that the tubular member 102 and attachment member 114 of the pool spring cover 100 are depicted in certain of the figures as being transparent. They may be. However, they may also be translucent or opaque depending on the materials used. In preferred embodiments, the material used is relatively flexible and exhibits a resiliency to environmental breakdown to permit its use for several years. A preferred material of construction is flexible colored PVC with UV additive. In one example of a device configured with flexible colored PVC with UV additive, the device features a durometer reading of approximately 83, an overall outside diameter of approximately 1.5", an inside diameter of approximately 1.35", and an overall length (of the tubular member) of 7.5". Other suitable dimensions, materials, and material features may also be provided.

Figure 3B:
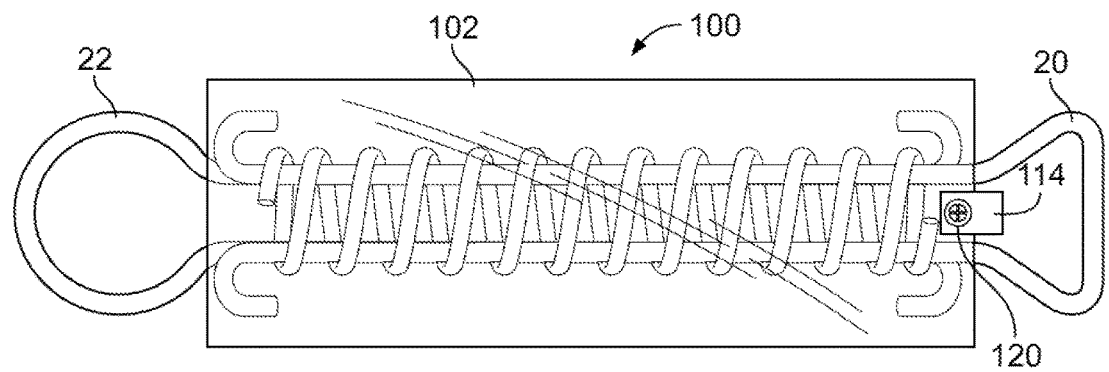
FIG. 3B depicts a top plan view of the pool spring cover with pool spring of FIG. 3A.

Moving to FIG. 3B, there is depicted a top plan view of the pool spring cover 100 of FIG. 2. Of note is the first fastener element 120. In the embodiment shown in FIG. 3B, the first fastener element 120 is a one-way fastener, which may also be referred to as a one-time use fastener. Such fasteners are known in other arts and may include physical interference members (not shown) that prohibit unfastening of the fastener without compromising its integrity once fastened. In this application, this helps to ensure that the fastener does not come undone over time as often these types of fasteners are more resilient than others. Nevertheless, in other embodiments fasteners may be formed from standard multiple-use fasteners, such as snaps, hook and loop type fasteners, buttons, or ties. In still further arrangements, the fasteners may be substituted out and the attachment member 114 may be connected to the tubular member 102 through welding, such as chemical or heat welding, various adhesives, or other means.

Figure 3C:
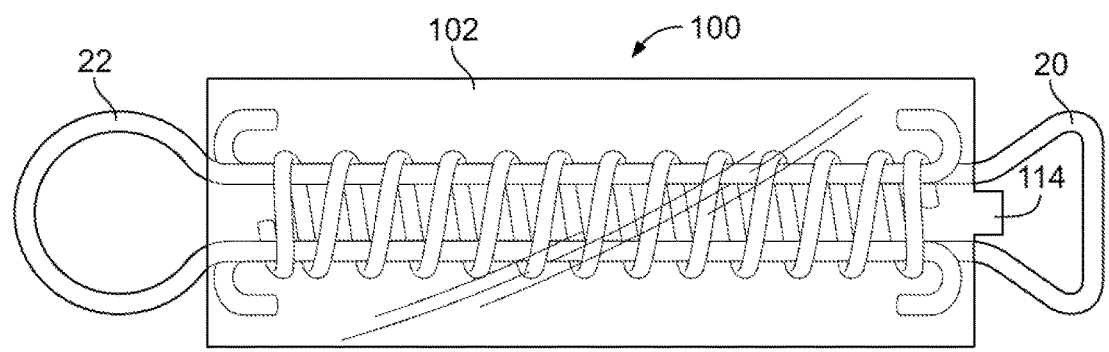
FIG. 3C depicts a bottom plan view of the pool spring cover with pool spring of FIG. 3A.
Figure 3D:
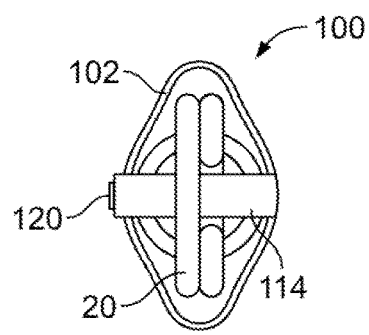
FIG. 3D depicts a side view of the pool spring cover with pool spring of FIG. 3A.

FIG. 3C depicts a bottom plan view, and FIG. 3D depicts a side view, of the pool spring cover 100 of FIG. 2. In these views, it may be seen that attachment member 114 is formed integrally with the tubular member 102 in this embodiment.

Figure 4:
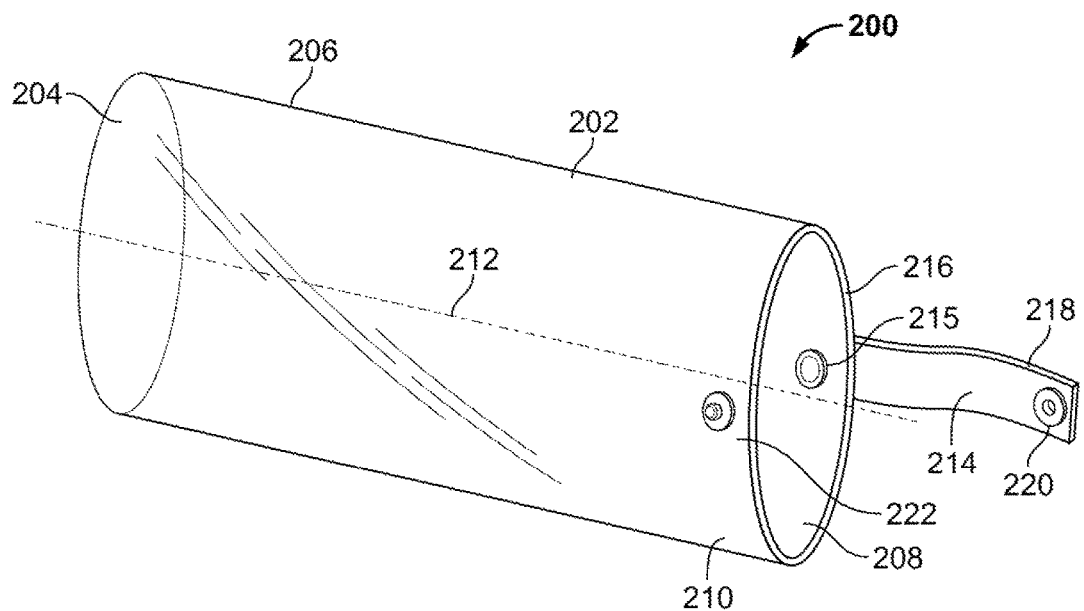
FIG. 4 depicts a perspective view of a pool spring cover in accordance with a second embodiment of the present invention.

FIG. 4 depicts a perspective view of a pool spring cover in accordance with a second embodiment of the present invention. This second embodiment of the pool spring cover 200 shares many features with the first embodiment, including its formation from an elongate tubular member 202 having a first opening 204 on a first side 206 and a second opening 208 on a second side 210. The first and second sides 206, 210 span a longitudinal axis 212 of the elongate tubular member 202. An attachment member 214 is also included. However, in this embodiment, the attachment member 214 is a separate piece from the tubular member 202. Thus, a connector 215 is provided to attach the attachment member 214 to the tubular member 202 at a first portion 216 of the second side 210 thereof. The attachment member 214 includes a free end 218 opposite the connector 215, which is provided with a first fastener element 220.

It is noted here that the connector 215 may be provided as any of the same structures as the fasteners of the prior embodiment, including one-way or one-time fasteners, snaps, hook and loop type fasteners, buttons, or ties. In addition, the connection may be by welding, such as chemical or heat welding, through adhesives, or the like.

At a second portion 222 of the second side 210 of the tubular member 202 is a second fastener element 224. The second fastener element 224 may be approximately 180 degrees around the tubular member 202 from the attachment member 214 and the first fastener element 220, as shown, or may be at other locations.

Figure 5A:
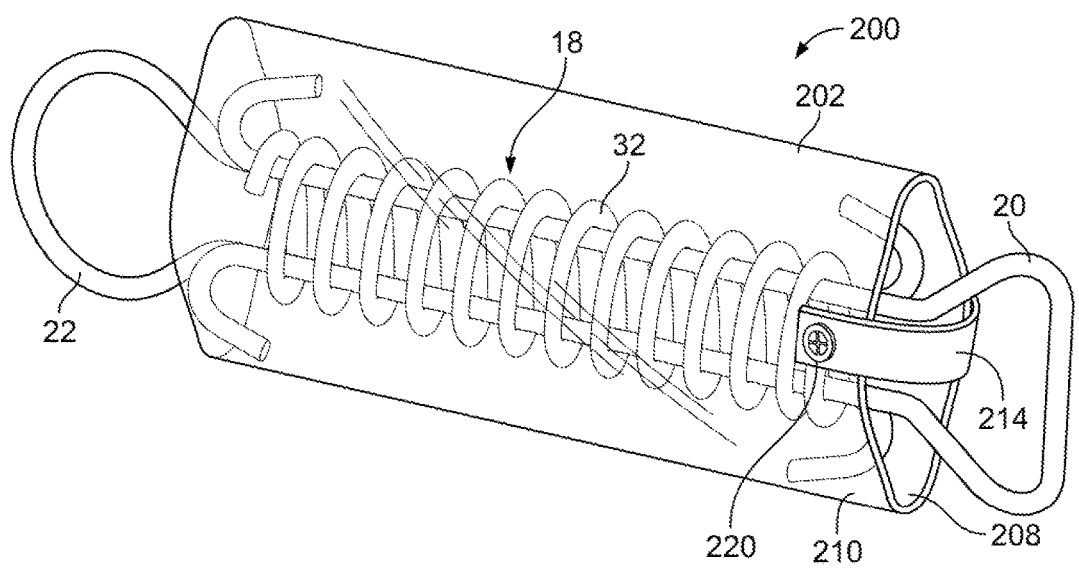
FIG. 5A depicts a perspective view of the pool spring cover of FIG. 4 with a pool spring.

As shown in FIG. 5A, the tubular member 202 of the pool spring cover 200 may be fitted over the helical spring 32 portion of the spring device 18 such that the second side 210 of the pool spring cover 200 is adjacent to the substantially triangular first connection element 20. The attachment member 114 may then be threaded through the substantially triangular first connection element 20 and the first fastener element 220 fastened to the second fastener element 224.

Figure 5B:
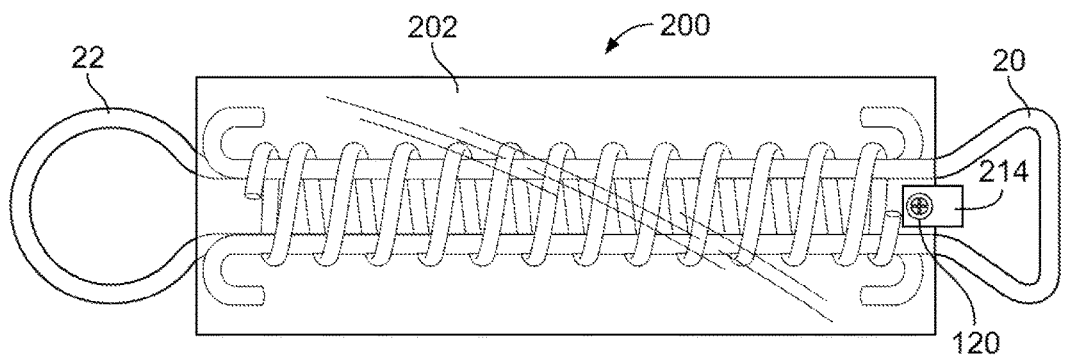
FIG. 5B depicts a top plan view of the pool spring cover with pool spring of FIG. 5A.
Figure 5C:
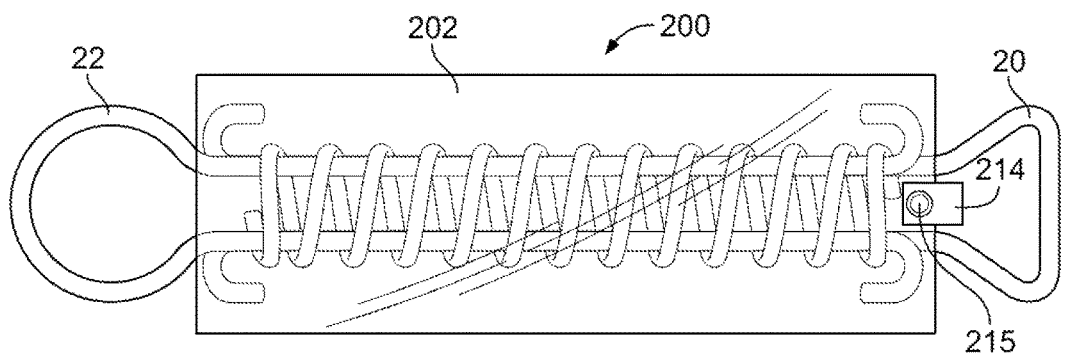
FIG. 5C depicts a bottom plan view of the pool spring cover with pool spring of FIG. 5A.
Figure 5D:
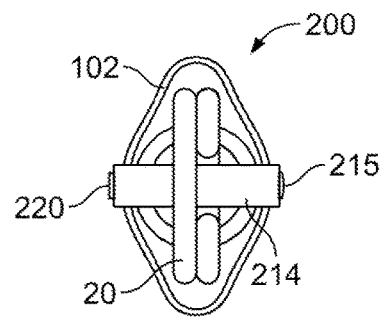
FIG. 5D depicts a side view of the pool spring cover with pool spring of FIG. 5A.

In FIG. 5B, there is depicted a top plan view of the pool spring cover 200 of FIG. 4. FIG. 5C depicts a bottom plan view, and FIG. 5D depicts a side view, of the pool spring cover 200 of FIG. 4. In these views, it may be seen that attachment member 214 is formed as a separate component than tubular member 202.

Figure 6:
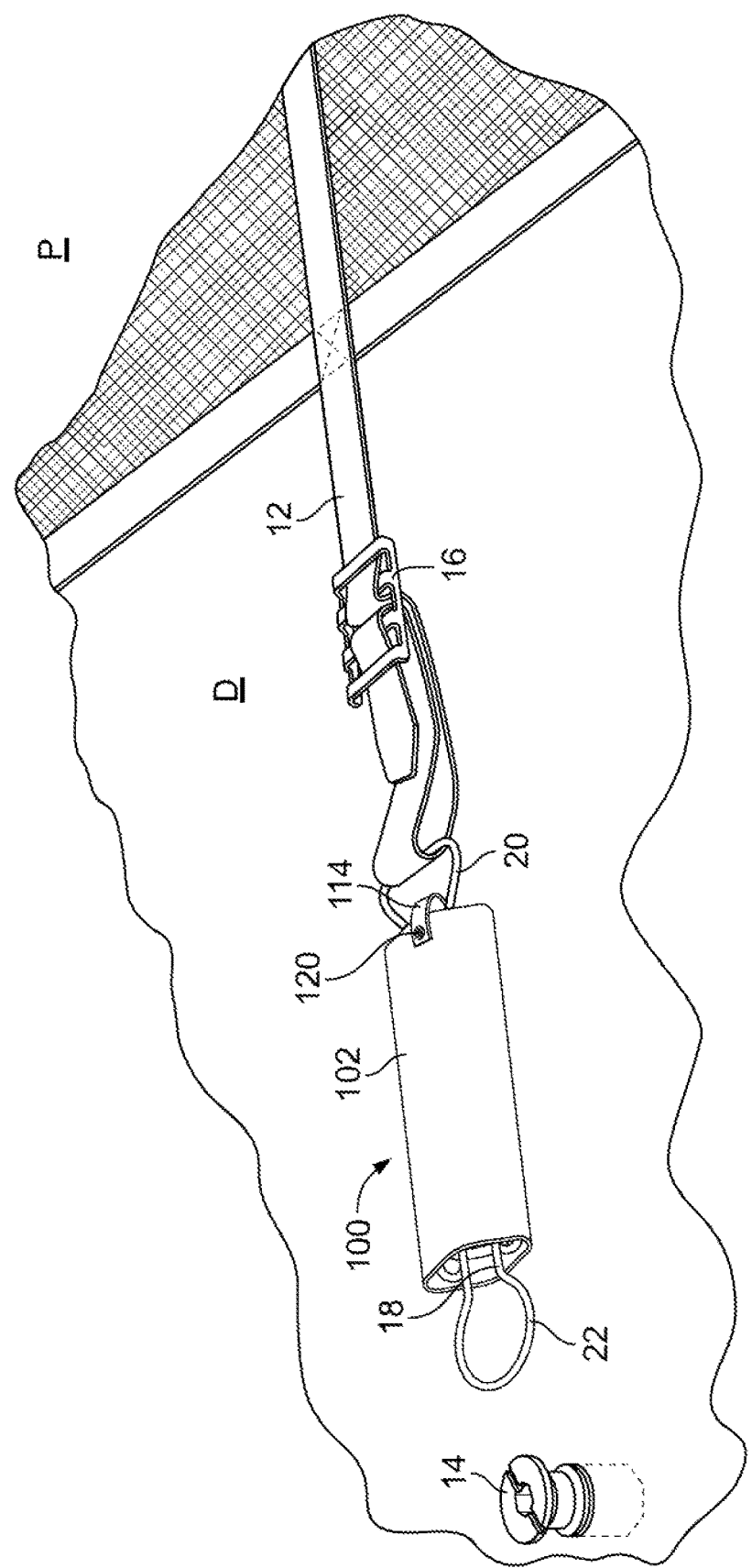
FIG. 6 depicts a perspective view of a pool cover spring system in a partially installed condition.
Figure 7:
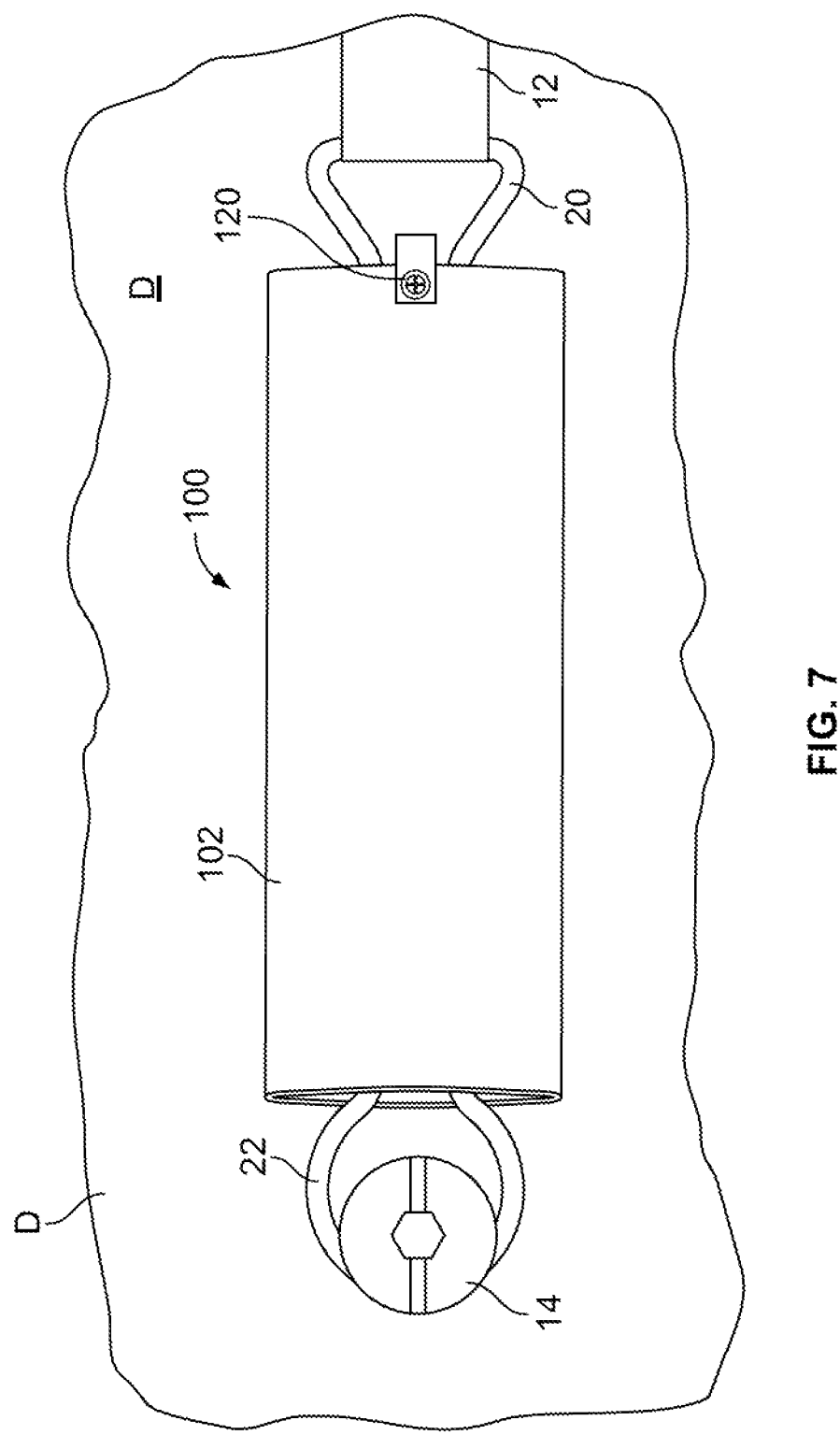
FIG. 7 depicts a top plan view of the pool cover spring system of FIG. 6 in an installed condition.

FIG. 6 depicts a perspective view of a pool cover spring system in a partially installed condition and FIG. 7 depicts a top plan view of the pool cover spring system of FIG. 6 in an installed condition. Here it is shown that pool cover 10 may be attached to a post 14 through a strap 12 and spring device 18 in the conventional manner. However, an additional pool spring cover 100 (or 200) may be added. As previously discussed, in order to add the pool spring cover 100 the spring device 18 may be threaded through the tubular member 102 prior to being engaged with the post 14. The attachment member 114 may then be threaded through the first connection element 20 and securely fastened by bringing first fastener element 120 in connection with the second connection element (not shown in FIG. 6). Once the pool spring cover 100 is so fitted, the second connection element 22 may be positioned over the post 14 as shown in FIG. 7 in the otherwise conventional manner.

It will be appreciated that the pool spring cover 100 will stay over top of the spring device 18 by virtue of the attachment member 114 being threaded through the first connection element 20 on the one side, and the second connection element 22 being fitted over the post 14 on the other. In other words, there is no physical location for the tubular member 102 to travel other than along with first connection element 20 as the spring device 18 expands and contracts. In this configuration, the tubular member 102 effectively protects the pool deck from damage by marring. The tubular member 102 provides the added benefit of creating a safe place for a user to grasp the spring device 18 without the need for gloves or other protective gear.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A pool covering system comprising:
    a pool cover having a plurality of connection members arrayed about a perimeter thereof;
    a plurality of spring devices each having a spring and first and second connection elements extending from opposing ends of the spring, the first connection element configured to connect with a corresponding one of the plurality of connection members, the second connection element configured to connect with a pool deck anchor device; and
    a plurality of spring covers each having a tubular body defining an opening extending therethrough from a first end to a second end thereof, each spring cover also having an attachment member extending from a first location at the first end thereof, the attachment member having a length dimensioned to extend across the opening to a second location at the first end, the attachment member including a first fastener element connectable to the tubular body at the second location, wherein the spring of a given one of the plurality of spring devices is substantially retained within the opening of a corresponding one of the spring covers when the attachment member secures the spring of the given spring device adjacent either the first or the second connection element.

2. The system of claim 1, wherein the attachment member is integrally formed with the tubular body.

3. The system of claim 1, wherein the tubular body includes a second fastener element disposed at the second location, the second fastener element adapted to securely receive the first fastener element.

4. The system of claim 3, wherein one of the first and second fastener elements includes a protuberance and the other one of the first and second fastener elements includes an opening for receipt of the protuberance.

5. The system of claim 4, wherein the protuberance includes a one-way feature that interfaces with the opening to prohibit removal of the protuberance once received within the opening.

6. The system of claim 5, wherein the tubular body includes a sidewall having a thickness defined between inner and outer surfaces thereof and a length extending along a longitudinal axis thereof, and the second location is located along the length of the sidewall at the first end.

7. The system of claim 1, wherein:
the first location is located at one side of the first end and the second location is located at an opposite side of the first end; and
the attachment member is elongate and threadable through a receptacle of the first or the second connection element.

8. The system of claim 1, wherein:
the plurality of connection members comprises a plurality of straps extending from the perimeter of the pool cover,
each of the straps is threadable through the opening of a corresponding one of the first connection elements, and
the attachment member of a given one of the spring covers is threadable through the first connection element.

9. The system of claim 1, wherein:
the plurality of connection members comprises a plurality of straps extending from the perimeter of the pool cover,
each of the straps is threadable through the opening of a corresponding one of the first connection elements, and
the attachment member of a given one of the spring covers is threadable through the second connection element.

10. The system of claim 1, wherein the tubular body and attachment member of each spring cover comprises flexible colored polyvinyl chloride.

11. A pool covering kit comprising:
a plurality of spring devices each having a spring and first and second connection elements disposed at opposite ends of the spring, each first connection element being configured to connect with a respective pool deck anchor of a pool;

a pool cover having a plurality connection members configured to connect to corresponding ones of the second connection elements, the plurality of connection members being disposed at intervals along a perimeter of the pool cover; and a plurality of covers for corresponding ones of the plurality of spring devices, each cover having a body, an attachment member and a fastener member, the body having an inner surface defining a channel extending through the body and configured to receive the corresponding spring therein, the attachment member being connected to and extending from the body at a first location and connectable to the body at a second location via the fastener member.

12. The system of claim 11, wherein the fastener member includes a protuberance configured to be received by a fastener receptacle.

13. The system of claim 12, wherein the protuberance includes a one-way feature configured to engage the receptacle to prohibit removal of the protuberance from the receptacle upon connection thereto.

14. The system of claim 11, wherein the fastener member includes physical interference members that prohibit unfastening once fastened.

15. The system of claim 11, wherein the channel is dimensioned to allow at least the spring and either the first or second connection element to be passed therethrough and has a length dimensioned to cover the entirety of the spring while allowing the first and second connection elements to extend from first and second ends of the body, respectively.

16. The system of claim 11, wherein the inner surface and an outer surface of the body define a sidewall therebetween, the attachment member being an elongate member integral with the sidewall and having a length sufficient to span the channel and connect to the sidewall at the second location.

17. The system of claim 11, wherein the second location is disposed opposite the first location across the channel.

18. A pool spring cover for covering a pool spring member, the pool spring member including a spring and first and second connection elements extending from opposing ends thereof, the pool spring cover comprising:
a body having an inner surface defining a channel extending through the body from a first end of the body to a second end of the body remote from the first end, the channel configured to receive the spring of the pool spring member therein;
an attachment member integrally formed with and extending from the first end of the body at a first location thereof, the attachment member being threadable through a receptacle of either the first or second connection element and having a length sufficient to span the channel; and
a fastener disposed at an end of the attachment member a distance from the first location and being connectable to the body at a second location of the first end.

19. The pool spring cover of claim 18, wherein the body and the attachment member comprise flexible polyvinyl chloride.

20. The pool spring cover of claim 18, wherein the fastener includes physical interference members that prohibit unfastening once connected to the body at the second location.

* * * * *